US011247340B2

(12) United States Patent
Hsu et al.

(10) Patent No.: US 11,247,340 B2
(45) Date of Patent: Feb. 15, 2022

(54) METHOD AND APPARATUS OF NON-CONTACT TOOL CENTER POINT CALIBRATION FOR A MECHANICAL ARM, AND A MECHANICAL ARM SYSTEM WITH SAID CALIBRATION FUNCTION

(71) Applicant: INDUSTRIAL TECHNOLOGY RESEARCH INSTITUTE, Hsinchu (TW)

(72) Inventors: Sheng Chieh Hsu, Taipei (TW); Hao Hsiang Yang, Changhua (TW); Shu Huang, Hsinchu County (TW); Yan Yi Du, Kaohsiung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 314 days.

(21) Appl. No.: 16/232,642

(22) Filed: Dec. 26, 2018

(65) Prior Publication Data

US 2020/0198145 A1    Jun. 25, 2020

(30) Foreign Application Priority Data

Dec. 19, 2018   (TW) .................................. 107145859

(51) Int. Cl.
   *B25J 9/16*          (2006.01)
(52) U.S. Cl.
   CPC ........... *B25J 9/1692* (2013.01); *B25J 9/1697* (2013.01)
(58) Field of Classification Search
   CPC ........ B25J 9/101; B25J 9/1015; B25J 9/1602; B25J 9/16; B25J 9/02; B25J 9/12;
   (Continued)

(56) References Cited

U.S. PATENT DOCUMENTS

| 6,615,112 B1 * | 9/2003 | Roos ...................... B25J 9/1692 |
| | | 318/568.1 |
| 7,161,321 B2 | 1/2007 | Ban et al. |

(Continued)

FOREIGN PATENT DOCUMENTS

| CN | 100398274 C | 7/2008 |
| CN | 103209809 B | 7/2013 |

(Continued)

OTHER PUBLICATIONS

CN Office Action 201910037641.7 dated Feb. 1, 2021.

(Continued)

*Primary Examiner* — Khoi H Tran
*Assistant Examiner* — Shahzab H Shah
(74) *Attorney, Agent, or Firm* — Maschoff Brennan (57) ABSTRACT

This disclosure is related to a non-contact tool center point calibration method for a robot arm, and the method comprises: obtaining a coordinate transformation relationship between a flange surface of the robot arm and cameras by a hand-eye calibration algorithm; constructing a space coordinate system by a stereoscopic reconstruction method; actuating a replaceable member fixed with the flange surface to present postures in a union field of view of the cameras sequentially, recording feature coordinates of the replaceable member in the space coordinate system, and recording flange surface coordinates which is under the postures in the space coordinate system; obtaining a transformation relationship between a tool center point and the flange surface; and updating the transformation relationship into a control program of the robot arm. Moreover, the disclosure further discloses a calibration device performing the calibration method and a robot arm system having the calibration function.

8 Claims, 8 Drawing Sheets

(58) Field of Classification Search
CPC ......... B25J 9/15; B25J 9/28; B25J 9/56; B25J 9/74; B25J 9/79; B25J 9/94; B25J 11/0005; B25J 11/002; B25J 11/003; B25J 11/0045; B25J 11/005; B25J 11/0075; B25J 11/008; B25J 11/0095; B25J 13/08; B25J 13/003; B25J 13/006; B25J 13/02; B25J 13/04; B25J 13/06; B25J 19/021; B25J 9/1692; B25J 9/1697
See application file for complete search history.

(56) References Cited

U.S. PATENT DOCUMENTS

| | | | |
|---|---|---|---|
| 9,393,694 | B2 | 7/2016 | Wallack et al. |
| 9,848,034 | B2 | 12/2017 | Su et al. |
| 9,884,425 | B2 | 2/2018 | Yamaguchi et al. |
| 10,705,528 | B2* | 7/2020 | Wierzynski .......... G05D 1/0274 |
| 2008/0234863 | A1 | 9/2008 | Pagel et al. |
| 2008/0252248 | A1 | 10/2008 | Lundberg et al. |
| 2009/0118864 | A1 | 5/2009 | Eldridge et al. |
| 2010/0168915 | A1* | 7/2010 | Kagawa ................ B25J 9/1692 700/254 |
| 2011/0046782 | A1* | 2/2011 | Fixell .................... B25J 9/1692 700/251 |
| 2011/0280472 | A1* | 11/2011 | Wallack .................. G06T 7/80 382/153 |
| 2015/0266183 | A1* | 9/2015 | Alifragkis ............. B25J 9/1692 700/254 |
| 2016/0059419 | A1* | 3/2016 | Suzuki .................. B25J 9/1697 700/114 |
| 2016/0214255 | A1* | 7/2016 | Uhlenbrock .......... B25J 9/1697 |
| 2018/0103244 | A1 | 4/2018 | Fang et al. |
| 2018/0147727 | A1 | 5/2018 | Mewes et al. |
| 2018/0354137 | A1* | 12/2018 | Sirkett .................. B25J 9/1692 |
| 2020/0016758 | A1* | 1/2020 | Keller ................... B25J 9/1692 |
| 2020/0055195 | A1* | 2/2020 | Ignakov ................. B25J 13/08 |

FOREIGN PATENT DOCUMENTS

| | | |
|---|---|---|
| CN | 106426172 A | 2/2017 |
| CN | 107571290 A | 1/2018 |
| CN | 108115683 A | 6/2018 |
| CN | 108297096 A | 7/2018 |
| CN | 108453739 A | 8/2018 |
| TW | I507014 B | 11/2015 |
| TW | I584620 B | 5/2017 |
| TW | I602420 B | 10/2017 |

OTHER PUBLICATIONS

Ayadi, A., et al., "Fully automatic needle calibration for robotic-assisted puncture on small animals," 2007 IEEE/NIH Life Science Sysytems and Applications Workshop, pp. 85-88 (2007).

Bai, S., and Teo, Y.M., "Kinematic calibration and pose measurement of a medical parallel manipultor by optical position sensors," Seventh Internationai Conference on Control, Automation, Robotics And Vision (ICARCV'02), pp. 419-424 (Dec. 2002).

Hulke, U. and Gupta, A., "Single camera based motion tracking for minimally invasive surgery," 2014 22nd Mediterranean Conference on Conlrol and Automation (MED) University of Palermo, Italy, pp. 356-361 (Jun. 16-19, 2014).

Navarro-Alarcon, D., et al., "Adaptive image-based positioning of RCM mechanisms using angle and distance features," 2015 IEEE/RSJ International Conference on Intelligent Robots and Systems (IROS) Congress Center Hamburg, Germany, pp. 5403-5409 (Sep. 28-Oct. 2, 2015).

"Rüther, M., et al., "The narcissistic robot: Robot calibration using a mirror," 2010 11th Int. Conf. Control, Automation, Robotics and VisionSingapore, pp. 169-174 (Dec. 7-10, 2010)".

Wilson, T.J., et al., "Evaluating remote centers of motoon for minimally invasive surgical robots by computer vision," 2010 IEEE/ASME International Conference on Advanced Intelligent Mechatronics Montréal, Canada, pp. 1413-1418 (Jul. 6-9, 2010).

Wu, L., et al., "Simultaneous Hand-Eye, Tool-Flange, and Robot-Robot Calibration for Comanipulation by Solving the AXB=YCZ Problem," IEEE Transactions on Robotics, vol. 32, Issue 2, pp. 413-428 (Apr. 2016).

Taiwanese Office Action issued in corresponding application No. TW 107145859, dated Apr. 17, 2019.

* cited by examiner

METHOD AND APPARATUS OF NON-CONTACT TOOL CENTER POINT CALIBRATION FOR A MECHANICAL ARM, AND A MECHANICAL ARM SYSTEM WITH SAID CALIBRATION FUNCTION

CROSS-REFERENCE TO RELATED APPLICATIONS

This application claims the priority benefit of Taiwan application serial no. 107145859, filed on Dec. 19, 2018. The entirety of the above-mentioned patent application is hereby incorporated by reference herein and made a part of this specification.

TECHNICAL FIELD

This disclosure relates to a calibration device of a robot arm, a calibration method of the robot arm and a robot arm system with a calibration function, especially for a non-contact tool center point calibration device for the robot arm and a method thereof.

BACKGROUND

Since the automation production is a trend in recent years in industry, many production processes in the assembly line use a large number of robotic arms instead of the manual production. However, the automatic production of the robotic arms has difficult to overcome the problems of the error of mechanical motion and the calibration of the mechanism.

A traditional calibration method is a contact type calibration method. However, the contact type calibration method is to touch a sharp point at various angles by a robot arm controlled by an operator, and the contact type calibration method has several disadvantages, such as high human influence factors, time consuming, large errors, and inability to calibrate three-dimensional rotation. Moreover, it is necessary to recalibrate immediately in the case of a collision or a replacement of a workpiece. It takes much time to recalibrate the robot arms and the disadvantage of time consuming may further lead to a decrease the usage rate of machine tools.

SUMMARY

This disclosure is related to a non-contact tool center point calibration method for a robot arm, and the non-contact tool center point calibration method comprising: obtaining a coordinate transformation relationship between a flange surface of the robot arm and a plurality of cameras by a hand-eye calibration algorithm; constructing a space coordinate system according to the coordinate transformation relationship by a stereoscopic reconstruction method; actuating a replaceable member fixed to the flange surface by the robot arm to present a plurality of postures in a union field of view of the plurality of cameras sequentially, and for each of a plurality of feature points of the replaceable member, recording a plurality of feature coordinates under the plurality of postures in the space coordinate system, and recording a plurality of flange surface coordinates of the flange surface under the plurality of postures in the space coordinate system; obtaining a transformation relationship between a tool center point of the replaceable member and the flange surface according to the feature coordinates and the flange surface coordinates; and updating the transformation relationship into a control program of the robot arm.

This disclosure is related to a non-contact tool center point calibration device for a robot arm, and the non-contact tool center point calibration device comprises a plurality of cameras and a computing host. The plurality of cameras is configured to photograph the robot arm. The computing host is electrically connected to the plurality of cameras and configured to electrically connect to a controlling center of the robot arm. The computing host performs a hand-eye calibration algorithm to obtain a coordinate transformation relationship between a flange surface of the robot arm and the plurality of cameras, constructs a space coordinate system according to the coordinate transformation relationship by a stereoscopic reconstruction method, drives the robot arm to actuate a replaceable member fixed to the flange surface to present a plurality of postures in a union field of view of the plurality of cameras sequentially, drives the cameras to record, for each of a plurality of feature points of the replaceable member, a plurality of feature coordinates under the plurality of postures in the space coordinate system, record a plurality of flange surface coordinates of the flange surface under the plurality of postures in the space coordinate system, obtains a transformation relationship between a tool center point of the replaceable member and the flange surface according to the feature coordinates and the flange surface coordinates, and updates the transformation relationship into a control program of the robot arm.

This disclosure is related to a robot arm system with a calibration function, and the robot arm system comprises a robot arm, a plurality of cameras and a computing host. The robot arm has a controlling center and a flange surface at least, the controlling center is configured to perform a control program, and the flange surface is configured to hold a replaceable member. The plurality of cameras is configured to photograph the robot arm. The computing host is electrically connected to the plurality of cameras and the controlling center. The computing host performs a hand-eye calibration algorithm to obtain a coordinate transformation relationship between the flange surface and the plurality of cameras, constructs a space coordinate system according to the coordinate transformation relationship by a stereoscopic reconstruction method, drives the robot arm to actuate the replaceable member fixed to the flange surface to present a plurality of postures in a union field of view of the plurality of cameras sequentially, drives the cameras to record, for each of a plurality of feature points of the replaceable member, a plurality of feature coordinates under the plurality of postures in the space coordinate system, record a plurality of flange surface coordinates of the flange surface under the plurality of postures in the space coordinate system, obtains a transformation relationship between a tool center point of the replaceable member and the flange surface according to the feature coordinates and the flange surface coordinates, and updates the transformation relationship into a control program of the robot arm.

BRIEF DESCRIPTION OF THE DRAWINGS

The disclosure will become more fully understood from the detailed description given herein below and the accompanying drawings which are given by way of illustration only and thus are not limitative of the disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
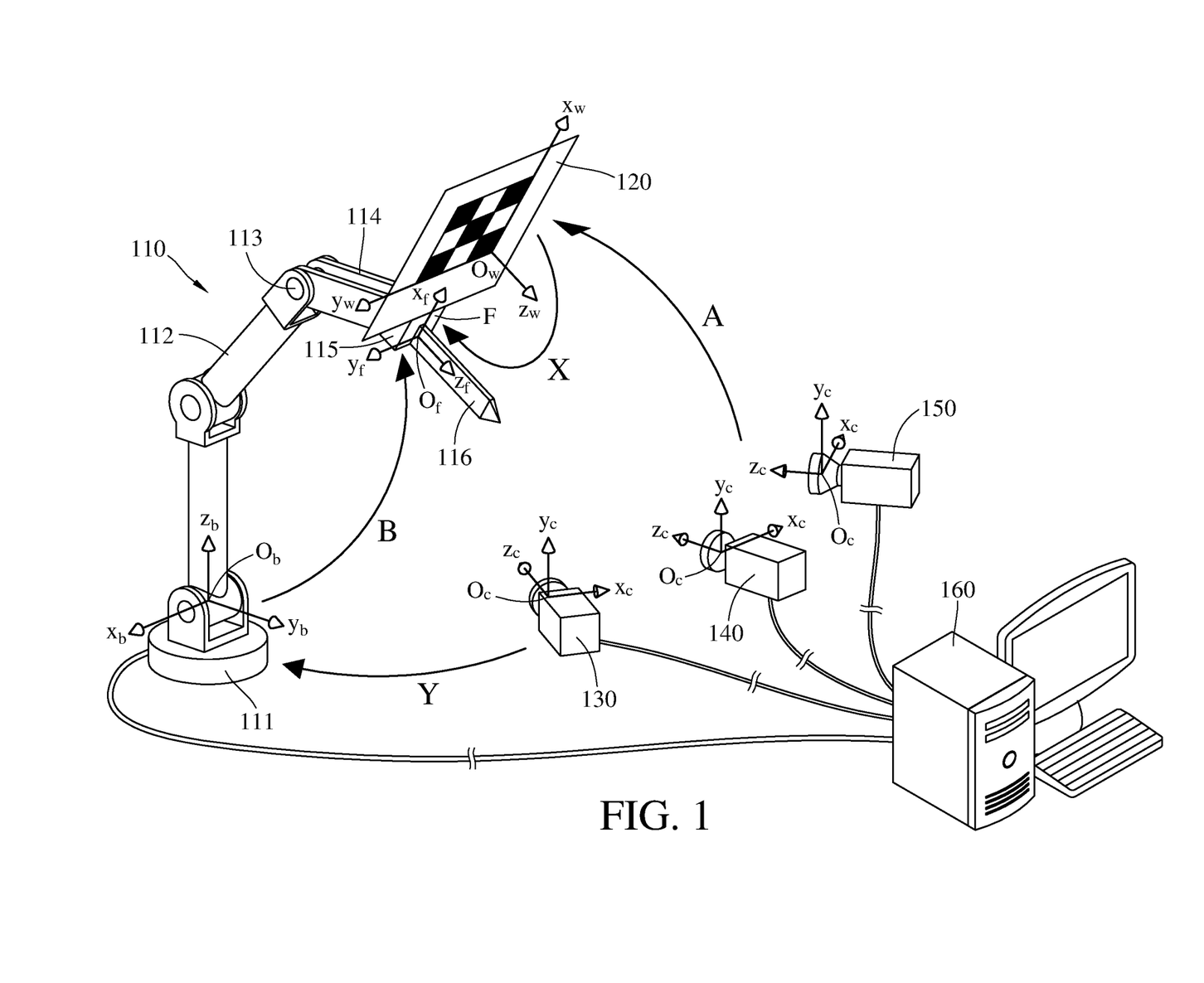
FIG. 1 is a schematic view of a calibration device for obtaining a coordinate transformation relationship between a robot arm and a plurality of cameras according to an embodiment of the disclosure.

Please refer to FIG. 1 which is a schematic view of a robot arm 110 performing a non-contact tool center point (TCP) calibration method according to an embodiment of the disclosure, and the non-contact TCP calibration method is not only limited to be implemented in this robot arm 110. The robot arm 110 includes a base 111, a plurality of extension arms 112 and 114, and a plurality of joints 113. The plurality of joints 113 and the plurality of extension arms 112 and 114 are mounted on the base 111. One of the joints 113 is connected between the base 111 and the extension arm 112 and the other joint 113 is connected between the extension arm 112 and extension arm 114 which is adjacent to the extension arm 112. One of the extension arms 112 and 114 (i.e., the extension arm 114 shown in FIG. 1) has a free end 115 that is not connected to the joint 113, and the free end 115 of the extension arm 114 forms a flange surface F. The flange surface F is configured to hold a replaceable member 116, wherein the replaceable member 116 can be a cutter, a jaw, or even a workpiece. Further, in order to implement the calibration method, the calibration method further comprises at least photographing the free end 115 of the extension arm 114 of the robot arm 110 and the flange surface F of the free end 115 by cameras. In this embodiment, a number of the cameras is three (i.e., the cameras 130, 140 and 150 shown in FIG. 1), but the number of the cameras can be two and the number of the cameras is not limited.

Figure 2:
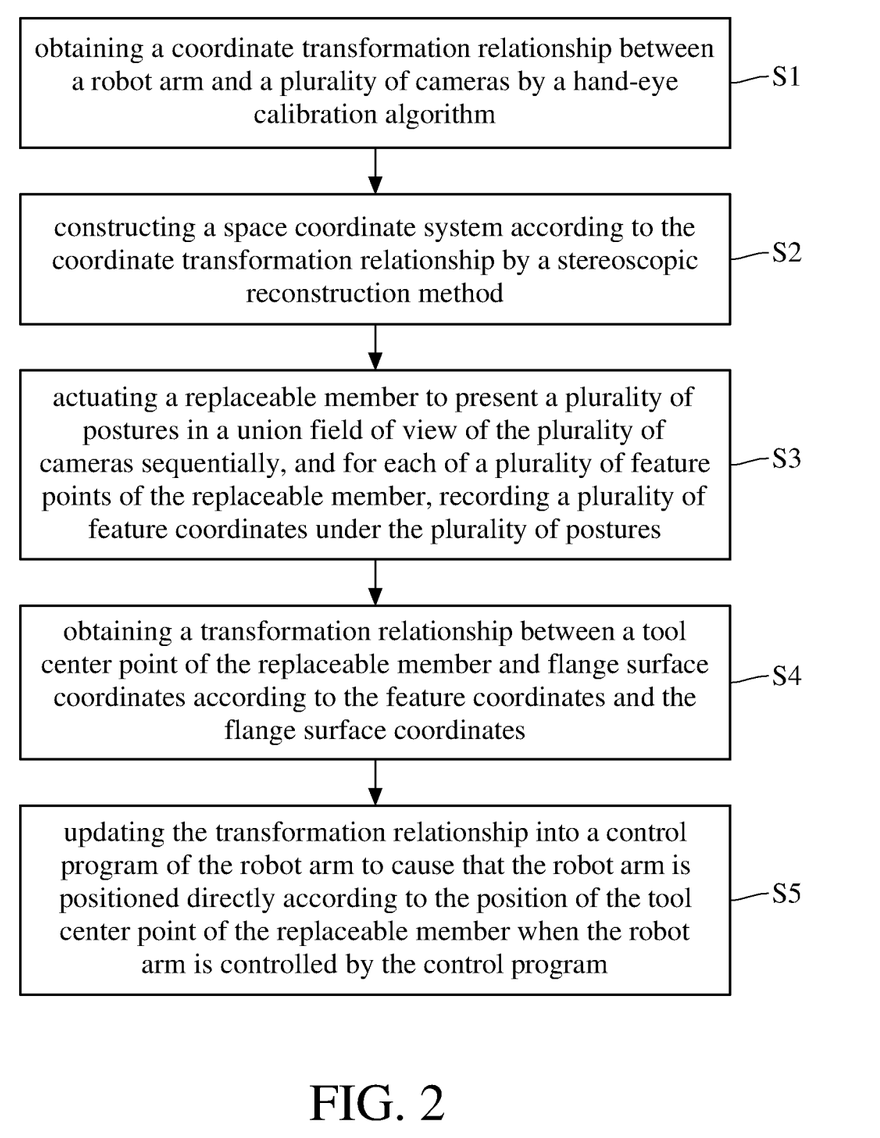
FIG. 2 is a flowchart of a non-contact tool center point calibration method for a robot arm according to an embodiment of the disclosure.

Please refer to FIG. 2 which is a flowchart of a non-contact tool center point calibration method for a robot arm according to an embodiment of the disclosure. Refer to FIGS. 1 and 2, step S1 is obtaining a coordinate transformation relationship between the flange surface F of the robot arm 110 and a plurality of cameras 130, 140 and 150 by a hand-eye calibration algorithm. In detail, as shown in FIG. 1, the plurality of cameras 130, 140 and 150 first photograph a calibration plate 120 fixed to the flange surface F to obtain images of the calibration plate 120, and the calibration plate 120 fixed to the flange surface F will appear in a field of view of each of the cameras 130, 140, 150 during the image capturing process. In detail, as shown in FIG. 1, a homogeneous coordinate transformation matrix A between the calibration plate 120 (its coordinate is $(x_w, y_w, z_w)$) and each of the cameras 130, 140, 150 (its coordinate is $(x_c, y_c, z_c)$), a homogeneous coordinate transformation matrix B between the flange surface F(its coordinate is $(x_f, y_f, z_f)$) and the base 111 (its coordinate is $(x_b, y_b, z_b)$), a homogenous coordinate transformation matrix X between the flange surface F and the fixed calibration plate 120, and a homogenous coordinate transformation matrix Y between the base 111 and each of the cameras 130, 140 and 150 can be defined. Although the homogeneous coordinate transformation matrixes A and B change with the movement of the flange surface F, the homogeneous coordinate transformation matrix A can be known based on the images which have the calibration plate 120 and are obtained by the cameras 130, 140 and 150, the homogeneous coordinate transformation matrix B can be known based on internal parameters of the robot arm 110. (i.e., the parameters of the homogeneous coordinate transformation matrixes A and B are known). On the other hand, even if the homogeneous coordinate transformation matrixes X, Y do not change with the movement of the flange surface F, the unknown homogeneous coordinate transformation matrixes X and Y must be solved by obtaining multiple sets of homogeneous coordinate transformation matrixes A and B and the formula of AX=YB because the positions of the cameras 130, 140 and 150 relative to the base 111 and the position of the calibration plate 120 relative to the flange surface F are not set in advance (i.e., the parameters of the homogeneous coordinate transformation matrixes X and Y are unknown), and then the coordinate transformation relationship between the flange surface F of the robot arm 110 and the cameras 130, 140 and 150 can be further obtained(i.e., AX or YB). The calibration method is called as a hand-eye calibration algorithm for calibrating the positions of the cameras relative to the position of the base in a space.

Figure 3:
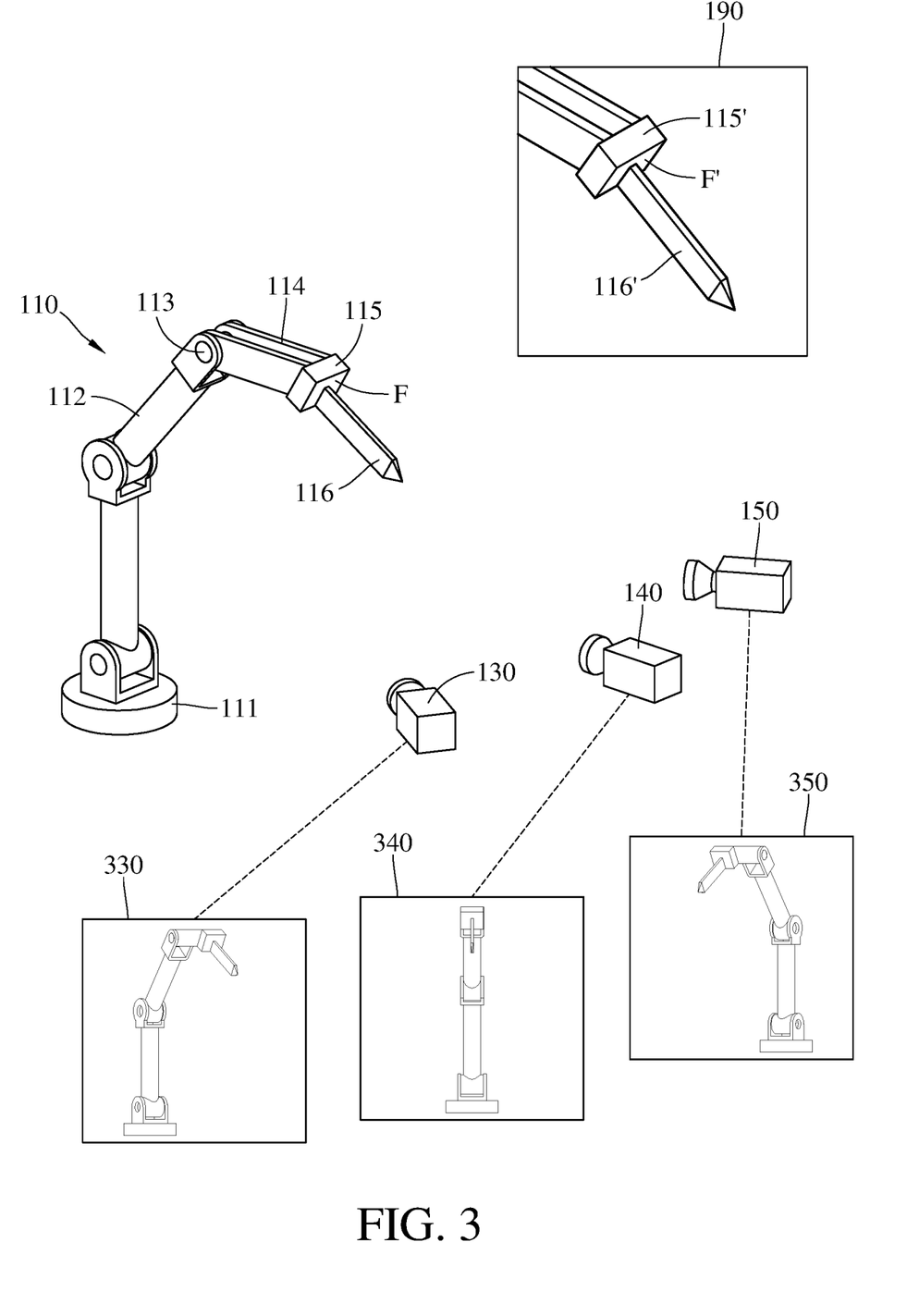
FIG. 3 is a schematic view of constructing a space coordinate system based on a coordinate transformation relationship between a robot arm and a plurality of cameras by a stereoscopic reconstruction method according to an embodiment of the disclosure.

Please refer to FIGS. 2 and 3, step S2 of FIG. 2 is constructing a space coordinate system according to the coordinate transformation relationship by a stereoscopic reconstruction method. The stereoscopic reconstruction method combines images 330, 340, and 350 photographed by the cameras 130, 140 and 150 with each other to calculate a three-dimensional structure of a combined image 190 and adds three coordinate axes to the combined image 190 according to coordinate transformation information calculated by the hand-eye calibration algorithm in step S1, whereby a three-dimensional coordinate of an object (including the free end 115 of the robot arm and the flange surface F) appearing in the combined image 190 can be identified in the space coordinate system. During the process of performing the stereoscopic reconstruction method, since the plurality of cameras 130, 140, 150 captures the images having the free end 115 of the robot arm 110 and the flange surface F in step S1, it is still capable to establish the space coordinate system by the stereoscopic reconstruction method as long as the free end 115 of the robot arm 110 and the flange surface F are located in an intersection field of view of the cameras 130, 140 and 150 for a part of time of the image capturing process, even though only a part of the images contains the free end 115 of the robot arm 110 and the flange surface F in other parts of time of the image capturing process. In other words, the stereoscopic reconstruction method can be performed when the flange surface F is only located in an intersection field of view of two of the cameras, and even when the flange surface F is only located in a field of view of one of the cameras. The intersection field of view refers to a field wherefrom all the cameras can capture images, that is, when the flange surface F is located in the intersection field of view, the images captured by all the cameras include the flange surface F.

Figure 4:
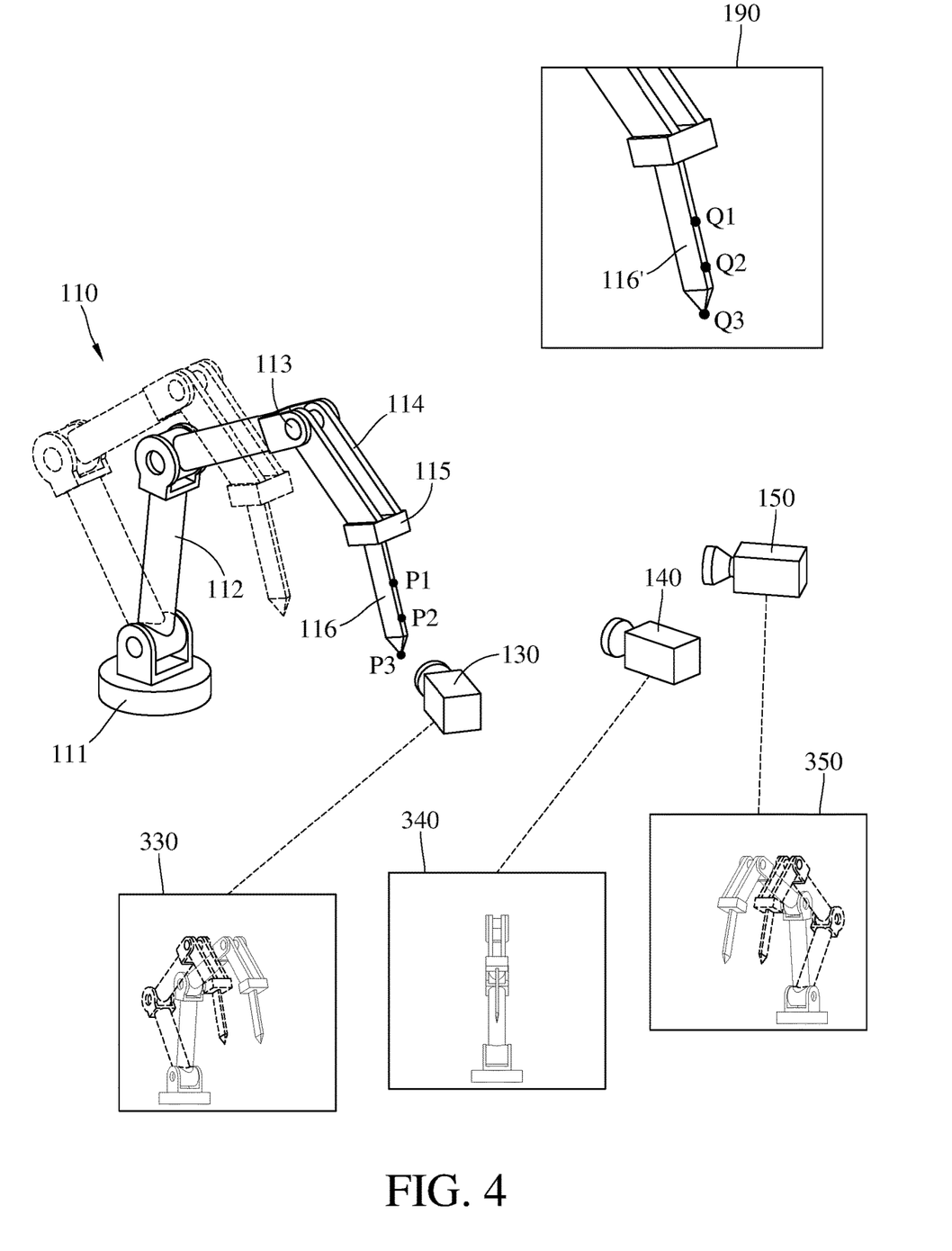
FIG. 4 is a schematic view of moving a replaceable member in an intersection field of view of a plurality of cameras for obtaining a translational coordinate calibrated by a tool center point according to an embodiment of the disclosure.
Figure 5:
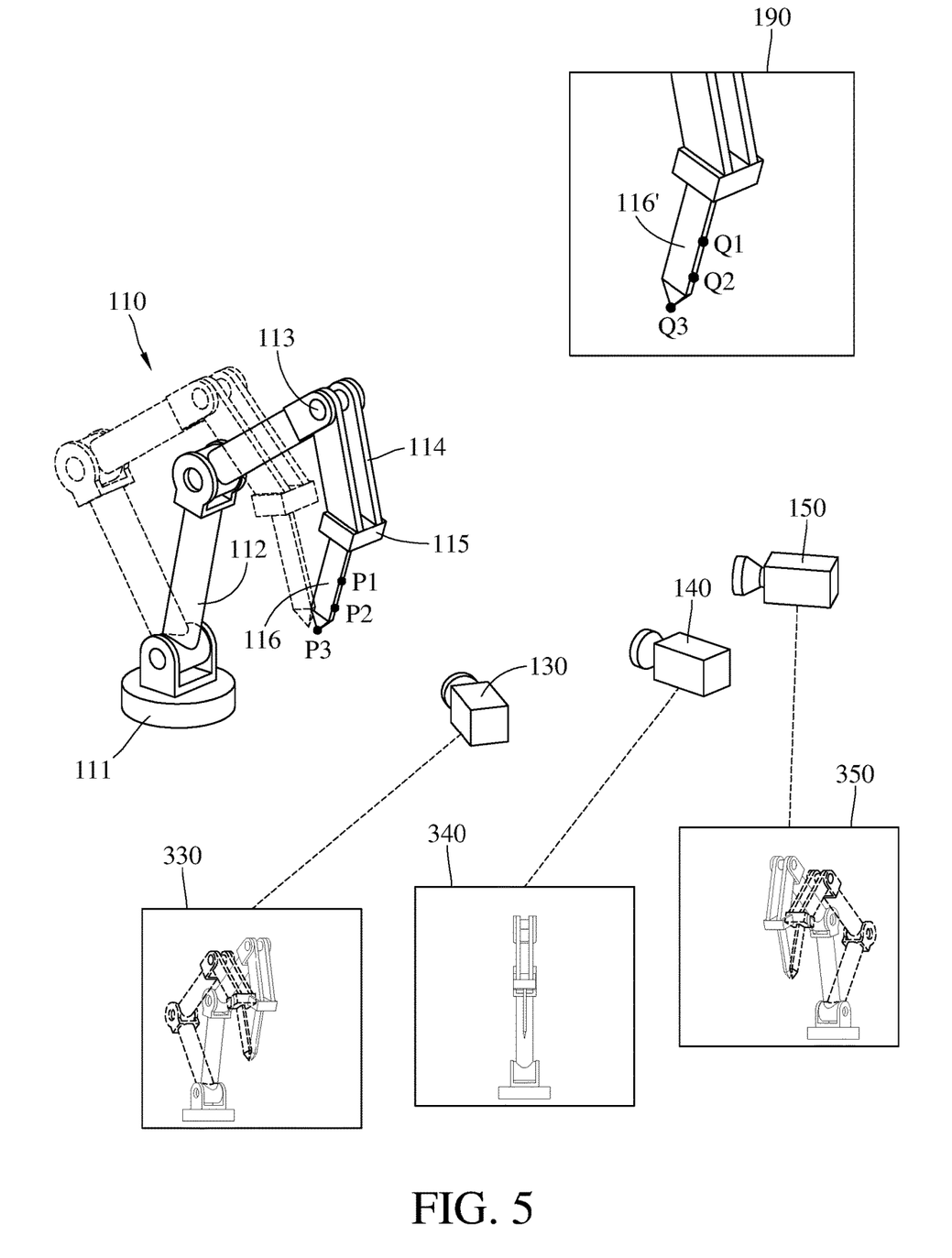
FIG. 5 is a schematic view of rotating a replaceable member in an intersection field of view of a plurality of cameras for obtaining a rotation matrix calibrated by a tool center point according to an embodiment of the disclosure.

Refer to FIGS. 2, 4 and 5, step S3 of FIG. 2 is actuating a replaceable member 116 fixed to the flange surface F to present a plurality of postures in a union field of view of the plurality of cameras 130, 140 and 150 sequentially (as shown in FIGS. 4 and 5), and for each of a plurality of feature points of the replaceable member 116, recording a plurality of feature coordinates under the plurality of postures in the space coordinate system, and recording a plurality of flange surface coordinates of the flange surface F under the plurality of postures in the space coordinate system. That is, in the case where the flange surface F is provided with the replaceable member 116, the robot arm 110 is driven to change the position of the flange surface F and the direction of the flange surface F, so that the replaceable member 116 can sequentially present a plurality of postures, and at least one of the cameras 130, 140 and 150 records the images 330, 340 and 350 of the replaceable member 116 under the plurality of postures and obtains a plurality of feature coordinates for each of a plurality of feature points of the replaceable member 116 corresponding to respective postures by the space coordinate system constructed in step S2. The union field of view refers to a field from which at least one of the cameras 130, 140 and 150 can capture images. That is, when the replaceable member 116 is located in the union field of view, at least one of the cameras 130, 140 and 150 can capture an image having the replaceable member 116. Preferably, changes between the various postures described above include: actuating the robot arm 110 to move the replaceable member 116 from an original position (with a posture shown by the dotted line in FIG. 4) to a translational position (with a posture shown by the solid line in FIG. 4) which is parallel to the original posture, and actuating the robot arm 110 to move the replaceable member 116 from the original position (a posture shown by the dotted line in FIG. 5) to a rotational position (a posture shown by the solid line in FIG. 5) which is skewed relative to the original posture.

In detail, as shown in FIG. 4, the implementation manner of identifying the posture presented by the replaceable member 116 may be: selecting a feature point P1, a feature point P2, and a feature point P3 from the replaceable member 116, wherein the feature point P1 and the feature point P2 are used to indicate an extending direction of the replaceable member 116, and the feature point P3 is used to indicate an end position of the replaceable member 116. However, the selection of the feature points is merely an example, and actually should be determined according to the structure of the replaceable member 116. A plurality of feature coordinates Q1, Q2 and Q3 corresponding to the feature points P1, P2, and P3 in the combined image 190 can be obtained by the cameras 130, 140, and 150 and the operations of the steps S1 and S2. Preferably, in order to accurately calibrate the translational movement of the robot arm 110 in three different axial directions of a space, the process of moving from the original position to the translational position is preferably performed multiple times (for example, at least four times), so that the replaceable member 116 can be moved to a plurality of different translational positions and multiple sets of the feature coordinates Q1, Q2, Q3 corresponding to the translational positions can be further obtained. With respect to the actual implementation of the translational movement of the replaceable member 116, after the replaceable member 116 moves to the translational position, the translational position can be used as a new original position of a next movement and be performed repeatedly in this manner. However, the replaceable member 116 also can be reset to the same original position before moving to the next translational position. Similarly, as shown in FIG. 5, in order to accurately calibrate the rotational movement of the robot arm 110 in three different axial directions of the space, the process of moving from the original position to the rotational position is preferably performed multiple times (for example, at least four times) to move the replaceable member 116 to a plurality of different rotational positions, and multiple sets of the feature coordinates Q1, Q2 and Q3 corresponding to the rotational positions can be further obtained. With respect to the actual implementation of the rotation of the replaceable member 116, after the replaceable member 116 moves to the rotational position, the rotational position can be used as a new original position of a next movement and be repeatedly performed in this manner. However, the replaceable member 116 also can be reset to the same original position before moving to the next rotational position.

Step S4 of FIG. 2 is obtaining a transformation relationship between a tool center point (i.e., the feature point Q3 shown in FIGS. 4 and 5) of the replaceable member 116 and the flange surface F according to the feature coordinates Q1, Q2 and Q3 and the flange surface coordinates. Step S5 of FIG. 2 is updating the transformation relationship into a control program of the robot arm 110. By the steps S4 and S5, the robot arm 110 can be positioned directly according to the position of the tool center point of the replaceable member 116 when the robot arm 110 is controlled by the control program. In step S4, a coordinate for presenting the tool center point including a translational coordinate of the tool center point and a rotation matrix of the tool center point, and the rotation matrix of the tool center point presents a rotational relationship of a coordinate system of the tool center point to a coordinate system of the flange surface and is obtained by performing a matrix operation.

By the calibration method described above, the transformation relationship which is between the coordinate system of the tool center point of the replaceable member 116 and the coordinate system of the flange surface F and set in the control program of the robot arm 110 can be quickly and accurately calibrated. After the calibration method is performed, a target position command of the control program contains the size of the replaceable member 116. Therefore, a user can assign image feature points by himself and complete all steps of the calibration method quickly after the replaceable member 116 fixed with the flange surface F is moved every time.

Figure 6:
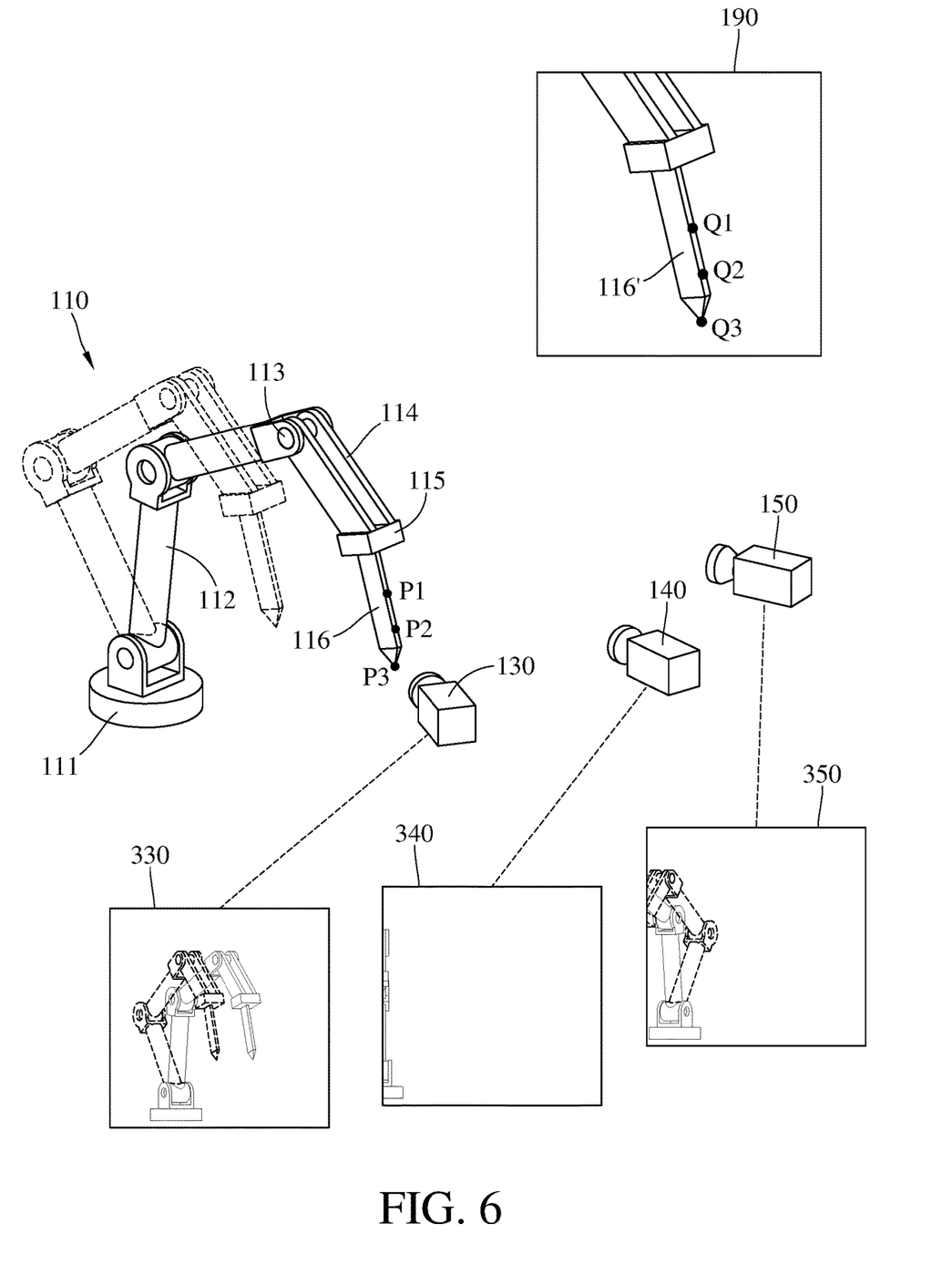
FIG. 6 is a schematic view of moving a replaceable member in a field of view of a single camera for obtaining a translational coordinate calibrated by a tool center point according to an embodiment of the disclosure.
Figure 7:
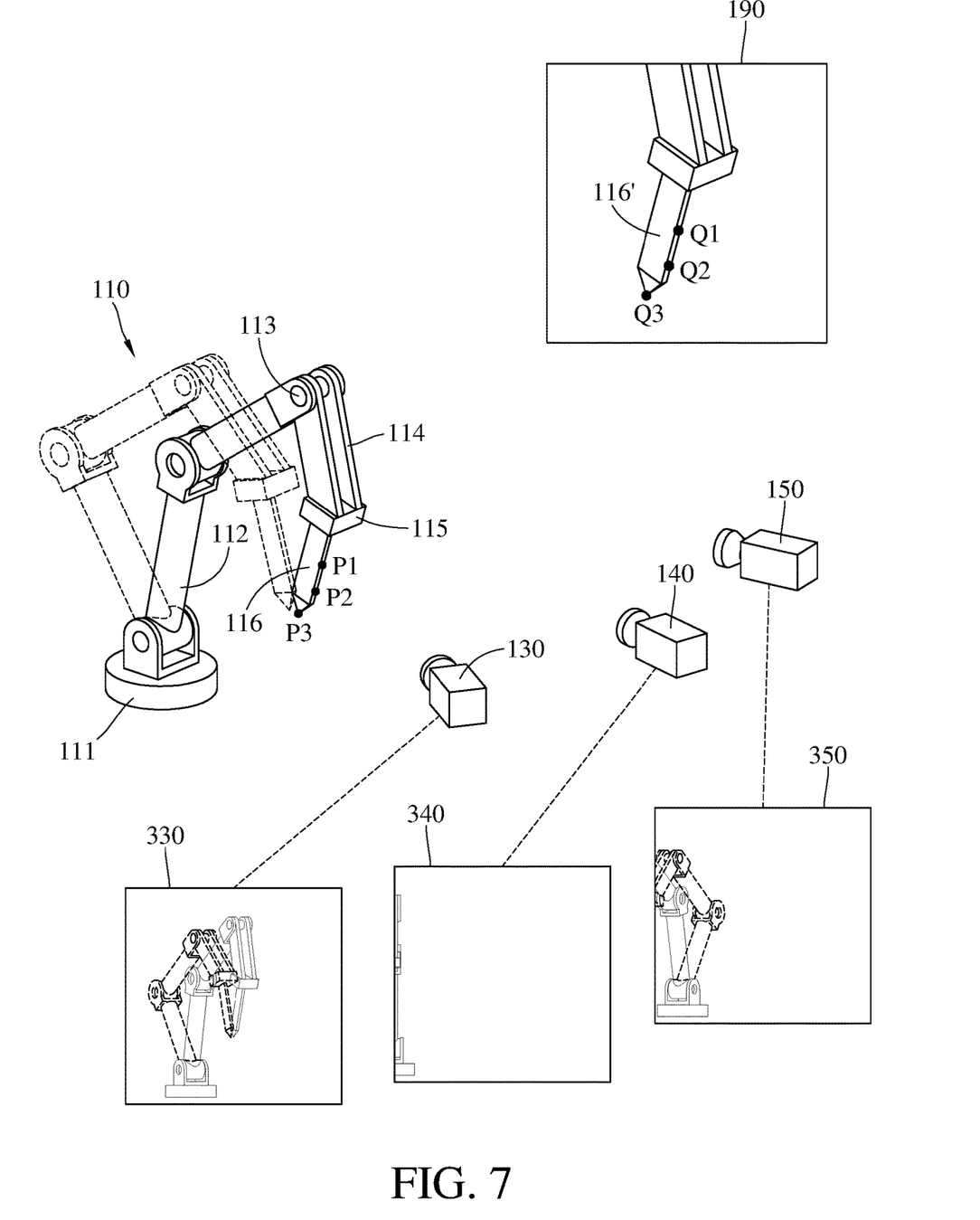
FIG. 7 is a schematic view of rotating a replaceable member in a field of view of a single camera for obtaining a rotation matrix calibrated by a tool center point according to an embodiment of the disclosure.

Please refer to FIGS. 6 and 7, since the space coordinate system has been established by the hand-eye calibration algorithm and the stereoscopic reconstruction method in steps S1 and S2, the feature coordinates Q1, Q2, Q3 of the feature points P1, P2, P3 in the image 330 captured by the camera 130 can still be indicated in the established space coordinate system even though only the single camera 130 captures a part of the postures of all the postures when the step S3 is performed. Therefore, if the intersection field of view of the cameras 130, 140, and 150 is sufficient to meet the requirement of performing the step S1 when the union field of view of the cameras 130, 140, 150 is sufficient to obtain images required to perform the step S3, the calibration method of the disclosure can be completed.

Moreover, with respect to the relationship between the number of the cameras and the accuracy of the calibration method of the disclosure, since the replaceable member 116 is photographed by the three cameras, a number of sets of the feature coordinates Q1, Q2 and Q3 obtained by the three cameras is one more than a number of sets of the feature coordinates obtained by two cameras, so that the error of solving the feature coordinates Q1, Q2, and Q3 of the replaceable member 116 can be reduced by a matrix expansion manner. Therefore, the feature coordinates Q1, Q2, Q3 can be more accurate when the calibration method is performed by using three cameras.

The calibration method of the disclosure is realized by a non-contact tool center point calibration device, and the calibration device comprises the plurality of cameras 130, 140, 150 and a computing host 160. The computing host 160 is electrically connected to the plurality of cameras 130, 140, 150 and a controlling center of the robot arm 110, and even the computing host 160 can be integrated with the controlling center of the robot arm 110 to form a single computing center, and arrangement of the calibration device are not limited. When the calibration device performs the calibration method, the computing host 160 acquires images including the calibration plate 120 and captured by the plurality of cameras 130, 140, and 150 and parameters of the robot arm 110 to obtain the coordinate transformation relationship by performing the hand-eye calibration algorithm in step S1. The computing host 160 further establishes the space coordinate system by performing the stereoscopic reconstruction method in step S2. After the computing host 160 establishes the space coordinate system, the computing host 160 drives the robot arm 110 to perform the translational movement of the replacement member 116 and the rotational movement of the replaceable member 116 by the controlling center, and the cameras 130, 140, 150 photograph images including the replaceable member 116 at the same time (i.e., step S3). Finally, the computing host 160 executes the steps S4 and S5 to update the control program of the controlling center, so that when the control program controls the robot arm 110, the control program directly positions the robot arm 110 according to the position of the tool center point of the replaceable member 116. Moreover, the non-contact tool center point calibration device can further be integrated with the robot arm 110 to form a robot arm system with a calibration function.

Figure 8:
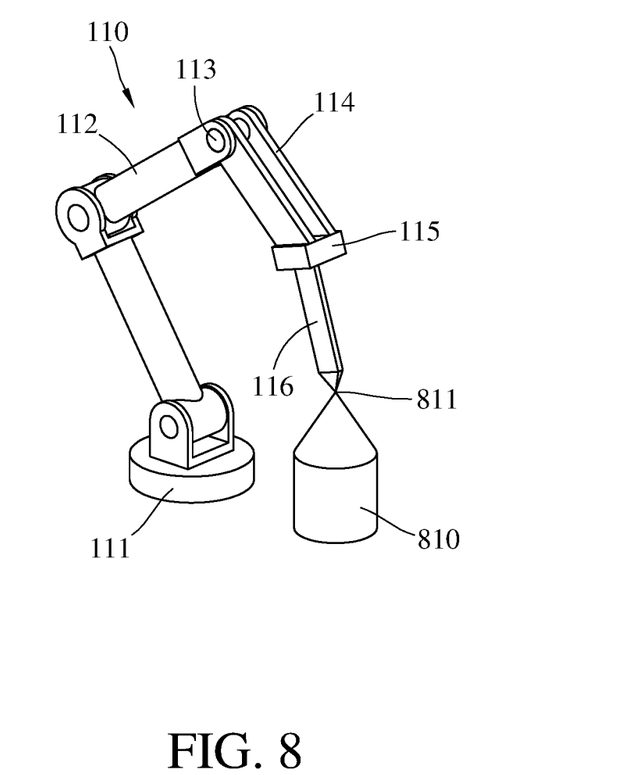
FIG. 8 is a schematic view of performing a circular motion of a tip end of a robot arm around an object for verifying whether a result of a calibration process is successful.

Please refer to FIG. 8, which is a schematic view of actuating a cone movement of the tool center point of the replaceable member 116 around a spatial position by a calibrated control program. The purpose of the cone movement of the tool center point is to further verify whether the calibrated control program of the robot arm 110 can accurately control the position of the tool center point of the replaceable member 116 during the cone movement of the tool center point. In detail, for the verification process described above, the spatial position can be constructed by a tip end 811 of a cone object 810, and the robot arm 110 and the replaceable member 116 can be actuated to rotate around the cone object 810. If the tool center point of the replaceable member 116 (the tip end of the replaceable member 116 in this embodiment) can accurately contact with and point the tip end 811 and does not contact with other portions of the cone object 810, which means that the accuracy of the calibration is high.

In view of the above description, the calibration method of the disclosure avoids disadvantages of conventional calibration methods by using a plurality of industrial cameras. If necessary, the number of the cameras can be more than three. Since the stereoscopic reconstruction method may be affected by image noises, hand-eye calibration error and so on, the use of multiple cameras can increase the amount of measurement data and reduce the error of calculating space coordinates. In addition, the use of multiple cameras means that the stereoscopic reconstruction method has more restrictions in order to avoid solving singular solutions. In addition, when the stereoscopic reconstruction method is performed, since the use of a single camera requires moving the replaceable member to multiple positions within a single field of view, the stereoscopic reconstruction method will fail if the replaceable member moves out of the field of view. In the case of using multiple cameras, the stereoscopic reconstruction method still can be successful only when the replaceable member is still located in the union field of view of these cameras even though the replaceable component has moved out of the intersection field of view of these cameras.

What is claimed is:

1. A non-contact tool center point calibration method for a robot arm, comprising:

obtaining a coordinate transformation relationship between a flange surface of the robot arm and a plurality of cameras by a hand-eye calibration algorithm;

constructing a space coordinate system according to the coordinate transformation relationship by a stereoscopic reconstruction method;

actuating a replaceable member fixed to the flange surface by the robot arm to present a plurality of postures in a union field of view of the plurality of cameras sequentially, and, for each of a plurality of feature points of the replaceable member, recording a plurality of feature coordinates under the plurality of postures in the space coordinate system, and recording a plurality of flange surface coordinates of the flange surface under the plurality of postures in the space coordinate system, wherein at least two of the plurality of feature points indicate an extending direction of the replaceable member, and at least another one of the plurality of feature points indicates an end position of the replaceable member;

obtaining a transformation relationship between a tool center point of the replaceable member and the flange surface according to the feature coordinates and the flange surface coordinates; and updating the transformation relationship into a control program of the robot arm; wherein obtaining the coordinate transformation relationship between the flange surface of the robot arm and the plurality of cameras by the hand-eye calibration algorithm comprises obtaining an image of the flange surface by the plurality of cameras; and constructing the space coordinate system according to the coordinate transformation relationship by the stereoscopic reconstruction method comprises:

performing the stereoscopic reconstruction method on the image obtained by at least two of the cameras when the flange surface is located in an intersection field of view of the at least two cameras; and performing the stereoscopic reconstruction method on another image obtained by one of the cameras having the replaceable member in a field of view of the camera when the replaceable member is only located in the field of view of said one of the cameras and not in the fields of view of rest of the cameras.

2. The non-contact tool center point calibration method in claim 1, wherein obtaining the coordinate transformation relationship between the flange surface of the robot arm and the plurality of cameras by the hand-eye calibration algorithm comprises a number of the cameras being at least three.

3. The non-contact tool center point calibration method in claim 1, wherein actuating the replaceable member fixed to the flange surface by the robot arm to present the plurality of postures in the union field of view of the plurality of cameras sequentially comprises a number of the postures being at least four.

4. The non-contact tool center point calibration method in claim 1, further comprising moving the flange surface to an intersection field of view of all the cameras before obtaining the coordinate transformation relationship between the flange surface of the robot arm and the plurality of cameras by the hand-eye calibration algorithm.

5. The non-contact tool center point calibration method in claim 1, wherein obtaining the transformation relationship between the tool center point of the replaceable member and the flange surface according to the feature coordinates and the flange surface coordinates comprises: a coordinate for presenting the tool center point including a translational coordinate of the tool center point and a rotation matrix of the tool center point.

6. The non-contact tool center point calibration method in claim 1, wherein obtaining the transformation relationship between the tool center point of the replaceable member and the flange surface according to the feature coordinates and the flange surface coordinates comprises: performing a matrix operation to obtain a rotational relationship of a coordinate system of the tool center point to a coordinate system of the flange surface.

7. A non-contact tool center point calibration device for a robot arm, comprising:

a plurality of cameras configured to photograph the robot arm; and a computing host, electrically connected to the plurality of cameras and configured to electrically connect to a controlling host of the robot arm;

wherein the computing host performs a hand-eye calibration algorithm to obtain a coordinate transformation relationship between a flange surface of the robot arm and the plurality of cameras, constructs a space coordinate system according to the coordinate transformation relationship by a stereoscopic reconstruction method, drives the robot arm to actuate a replaceable member fixed to the flange surface to present a plurality of postures in a union field of view of the plurality of cameras sequentially, drives the cameras to record, for each of a plurality of feature points of the replaceable member, a plurality of feature coordinates under the plurality of postures in the space coordinate system, record a plurality of flange surface coordinates of the flange surface under the plurality of postures in the space coordinate system, obtains a transformation relationship between a tool center point of the replaceable member and the flange surface according to the feature coordinates and the flange surface coordinates, and updates the transformation relationship into a control program of the robot arm, wherein at least two of the plurality of feature points indicate an extending direction of the replaceable member, and at least another one of the plurality of feature points indicates an end position of the replaceable member;

the computing host performs the hand-eye calibration algorithm to obtain a coordinate transformation relationship between a flange surface of the robot arm and the plurality of cameras comprises: the computing host constructs the space coordinate system according to the coordinate transformation relationship by using the stereoscopic reconstruction method, and the computing host constructs the space coordinate system comprises: performing the stereoscopic reconstruction method on an image of the flange surface obtained by at least two of the cameras when the flange surface is located in an intersection field of view of the at least two cameras; and the computing host constructs the space coordinate system according to the coordinate transformation relationship by the stereoscopic reconstruction method further comprises: performing the stereoscopic reconstruction method on another image obtained by one of the cameras having the replaceable member in a field of view of the camera when the replaceable member is only located in a field of view of said one of the cameras and not in fields of view of rest of the cameras.

8. A robot arm system with a calibration function comprising:

a robot arm, having a controlling host and a flange surface at least, with the controlling host configured to perform a control program, with the flange surface configured to hold a replaceable member;

a plurality of camera, configured to photograph the robot arm; and a computing host electrically connected to the plurality of cameras and the controlling host;

wherein the computing host performs a hand-eye calibration algorithm to obtain a coordinate transformation relationship between the flange surface and the plurality of cameras, constructs a space coordinate system according to the coordinate transformation relationship by a stereoscopic reconstruction method, drives the robot arm to actuate the replaceable member fixed to the flange surface to present a plurality of postures in a union field of view of the plurality of cameras sequentially, drives the cameras to record, for each of a plurality of feature points of the replaceable member, a plurality of feature coordinates under the plurality of postures in the space coordinate system, record a plurality of flange surface coordinates of the flange surface under the plurality of postures in the space coordinate system, obtains a transformation relationship between a tool center point of the replaceable member and the flange surface according to the feature coordinates and the flange surface coordinates, and updates the transformation relationship into a control program of the robot arm, wherein at least two of the plurality of feature points indicate an extending direction of the replaceable member, and at least another one of the plurality of feature points indicates an end position of the replaceable member, and the computing host performs the hand-eye calibration algorithm to obtain a coordinate transformation relationship between a flange surface of the robot arm and the plurality of cameras comprises: the computing host constructs the space coordinate system according to the coordinate transformation relationship by using the stereoscopic reconstruction method, and the computing host constructs the space coordinate system comprises: performing the stereoscopic reconstruction method on an image of the flange surface obtained by at least two of the cameras when the flange surface is located in an intersection field of view of the at least two cameras; and the computing host constructs the space coordinate system according to the coordinate transformation relationship by the stereoscopic reconstruction method further comprises: performing the stereoscopic reconstruction method on another image obtained by one of the cameras having the replaceable member in a field of view of the camera when the replaceable member is only located in a field of view of said one of the cameras and not in fields of view of rest of the cameras.

\* \* \* \* \*